(12) United States Patent
Laaksonen

(10) Patent No.: US 6,980,162 B1
(45) Date of Patent: Dec. 27, 2005

(54) INTEGRATED ANTENNA

(75) Inventor: Juha Laaksonen, Paimio (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/941,756

(22) Filed: Sep. 14, 2004

(51) Int. Cl.[7] ............................................. H01Q 1/24
(52) U.S. Cl. ....................................... 343/702; 343/882
(58) Field of Search .............................. 343/702, 895, 343/866, 867, 742, 872, 882; 455/90, 550, 455/556, 557, 558, 575

(56) References Cited

U.S. PATENT DOCUMENTS

| | | | |
|---|---|---|---|
| 4,814,782 A * | 3/1989 | Chai | 343/787 |
| 6,011,519 A * | 1/2000 | Sadler et al. | 343/742 |
| 6,037,906 A * | 3/2000 | Engblom | 343/702 |
| 6,272,356 B1 * | 8/2001 | Dolman et al. | 455/575.3 |
| 6,353,733 B1 * | 3/2002 | Murray et al. | 455/90.1 |
| 6,414,643 B2 * | 7/2002 | Cheng et al. | 343/702 |
| 6,697,022 B2 * | 2/2004 | Ponce De Leon et al. | 343/702 |
| 2003/0234743 A1 | 12/2003 | Ponce De Leon et al. | 343/702 |

* cited by examiner

*Primary Examiner*—Hoang V. Nguyen
*Assistant Examiner*—Huedung X. Cao
(74) *Attorney, Agent, or Firm*—Alfred A. Fressola; Ware, Fressola, Van Der Sluys & Adolphson LLP

(57) ABSTRACT

An antenna is integrated inside a mobile terminal comprising a lid, a base, a hinge element, a keyboard and a screen. The antenna is located inside the hinge element of the mobile terminal. The hinge element containing the integrated antenna connects the base and the lid of the mobile terminal.

14 Claims, 2 Drawing Sheets

INTEGRATED ANTENNA

FIELD OF INVENTION

This invention relates to an integrated antenna, especially to an antenna integrated to a hinge element of a mobile terminal.

BACKGROUND OF THE INVENTION

Current mobile terminals can have several different radio parts. For example one for connecting the mobile terminal to a cellular network, one for connecting the terminal to a wireless LAN network and one for connecting the terminal to a Bluetooth device. In addition it can have a FM-radio part for the listening of the broadcast stations.

It usually is easy to integrate the antennas of the different radio parts inside the mobile terminal because of the small wavelengths used in for example GSM, WLAN and Bluetooth. On the other hand, it can be difficult to integrate a FM-radio antenna inside a small mobile terminal because of the larger antenna sizes resulting from the larger wavelengths used.

Traditionally the FM-radio antenna of the mobile terminal has used the cord of the portable hands-free unit or the earplugs. Because of this the FM-radio of the mobile terminal can not be used without attaching the hands-free unit even if the mobile terminal has a suitable speaker for radio listening.

A solution to the above mentioned problem could be the usage of an external wire antenna attached to the connector of the portable hands-free unit or the usage of an external whip antenna. These solutions however are external units, and do not bring any solution to the integration of FM-radio antenna to the mobile terminal, especially inside the terminal.

From the publication U.S. 2003/0234743 is know an approach to solve the above mentioned problem. In the publication is described an antenna element incorporated in the hinge mechanism of a mobile terminal. The antenna of the publication is preferably a dual band antenna that is intended to be used on for example DCS or GSM frequencies (1800 MHz and 900 MHz frequency ranges).

At these frequencies the antenna can be very small, at least if on the lower frequency range (900 MHz) a helical antenna element is used. This helical antenna element also acts as the spring of the hinge mechanism, that is it is a functional part of the mobile terminal. This exposes the antenna element to mechanical stress and it can break down.

SUMMARY OF THE INVENTION

The object of the invention is to provide an antenna integrated inside a mobile terminal. This mobile terminal comprises a lid, a base, a hinge element, a keyboard and a screen. Said antenna is according to the invention located inside the hinge element of the mobile terminal.

With the integrated antenna of the invention there is no need for any external antennas. The integrated antenna of the invention is not subjected to mechanical stress and it can also be used with lower frequency band solutions.

DETAILED DESCRIPTION OF THE PREFERRED EMBODIMENT

Figure 1:
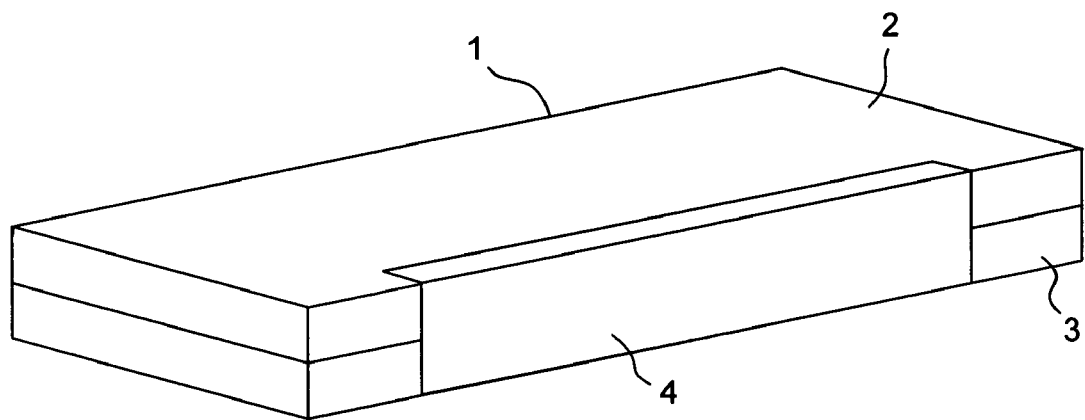
FIG. 1 presents a perspective view of the mobile terminal according to the invention viewed behind and closed.
Figure 2:
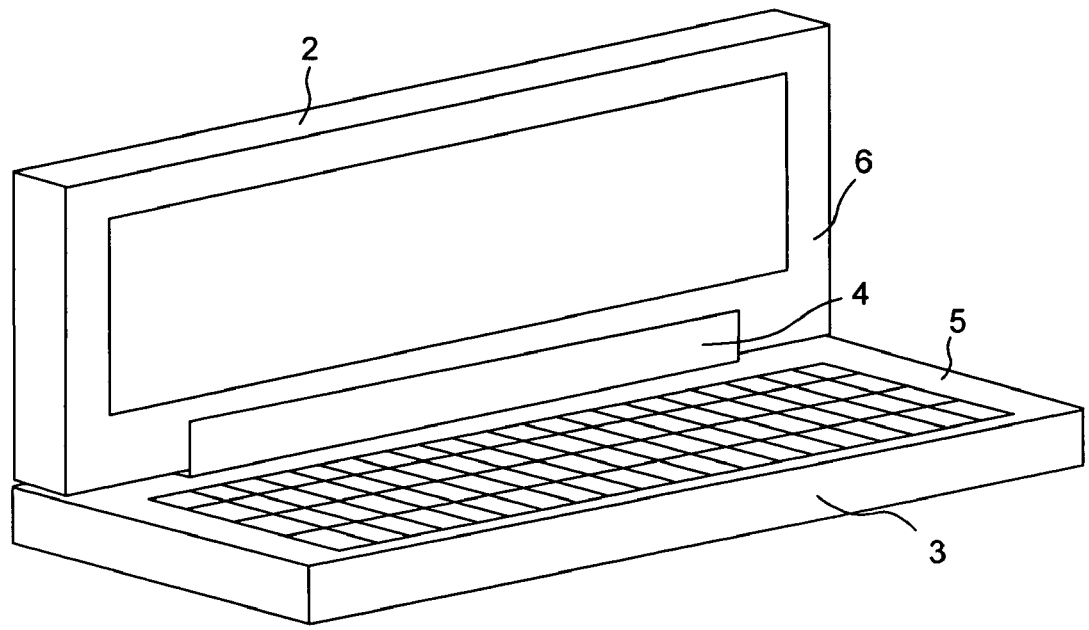
FIG. 2 presents a perspective view of the mobile terminal according to the invention viewed front and opened.

The mobile terminal 1 presented in FIG. 1 and FIG. 2 comprises a lid 2, a base 3, a hinge element 4, a keyboard 5 and a screen 6. The lid 2 and the base 3 of the mobile terminal 1 are connected with each other with the hinge element 4. The keyboard 5 is located in the base 3 and the screen 6 in the lid 2 of the mobile terminal 1.

Figure 3:
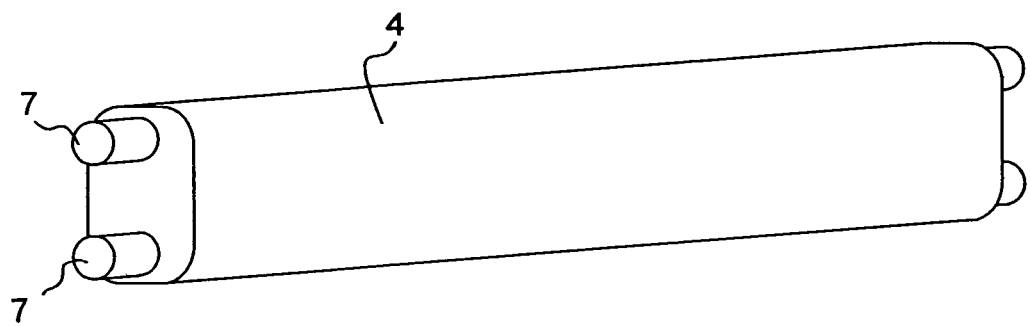
FIG. 3 presents a perspective view of the hinge element of the mobile terminal according to the invention.
Figure 4:
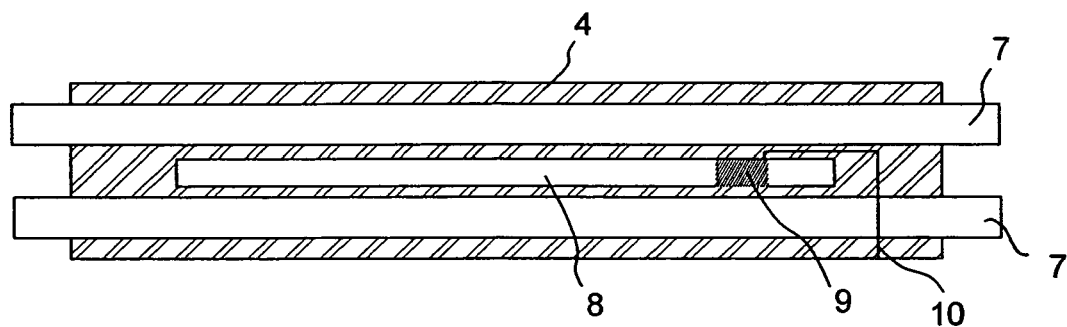
FIG. 4 presents the cross section of the hinge element of the mobile terminal according to the invention.

As seen in FIGS. 3 and 4, the hinge element 4 comprises hinge pins 7 for connecting the upper part of the hinge element 4 to the lid 2 and the lower part to the base 3. The hinge element allows the lid 2 to be opened revealing the keyboard 5 and the screen 6. Electrical connection between the lid 2 and the base 3 can be arranged with a ribbon cable or similar flexible cable. The ribbon cable not shown in the figures goes preferably through the hinge element 4.

Also inside of the hinge element 4 is located the antenna 8. The dimensioning and the type of the antenna 8 depends on what frequency band the antenna 8 is intended to be used. For example if the antenna 8 is intended to be used as a receive antenna on FM broadcast band, it is advantageous to use a ferrite rod antenna, because the structure of the antenna is small compared to the wavelengths used.

The ferrite rod antenna 8 can for example be located inside the hinge element between hinge pins 7. The antenna element comprises coiling 9 for connecting the antenna 8 electrically to the FM-radio part of the mobile terminal 1. The electrical connection from the coiling 9 can be done for example via cable 10 going outside the hinge element 4 or via the ribbon cable going through the hinge element 4 from the base 3 to the lid 2.

In this example the hinge element 4 comprises hinge pins 7 which go through the whole hinge element and which preferably are made of material that does not affect the electrical characteristics of the antenna 8. The hinge element 7 can also be made without separate hinge pins 7, for example it can be molded as a one piece and have a different shape. In this case the antenna 8 can also be molded at the same time inside the hinge element 4.

Other types of antennas can also be used according to the invention. For example, if a WLAN or Bluetooth antenna is integrated inside the hinge element 4, the antenna 8 can be a straight wire antenna or a helix antenna. The antenna 8 located inside the hinge element 4 can also be a dual-band antenna.

In this example there are not any impedance matching or any other RF-components inside the hinge element, since close proximity of any grounded parts degrades the effect of the antenna. However, for example an amplifier or filters can be implemented inside the hinge element 4.

For the one skilled in art it is obvious that the preceding example does not limit the scope of the invention, and that the different alternatives of the invention are defined by the claims.

What is claimed is:

1. An integrated antenna (8) integrated to a mobile terminal (1), the mobile terminal (1) comprising a lid (2), a base (3), a hinge element (4), a keyboard (5) and a screen (6), characterized in that, the hinge element includes first and second hinge pins (7), the first hinge pin pivotally connected to the lid (2) and the second hinge pin pivotally connected to the base (3), and wherein the antenna (8) is located inside the hinge element (4) between the first and second hinge pins (7).

2. An integrated antenna (8) according to the claim 1, characterized in that, the antenna (8) is a ferrite rod antenna.

3. An integrated antenna (8) according to the claim 1, characterized in that, the antenna (8) is a straight wire antenna.

4. An integrated antenna (8) according to the claim 1, characterized in that, the antenna (8) is a helix antenna.

5. An integrated antenna (8) according to the claim 1, characterized in that, the antenna (8) is a dual-band antenna.

6. An integrated antenna (8) according to claim 5, characterized in that, the hinge element (4) further comprises integrated RF-parts.

7. An integrated antenna (8) according to claim 6, characterized in that, the antenna (8) is electrically connected to the RF-part of the mobile equipment (1) via cable.

8. An integrated antenna (8) according to claim 7, characterized in that, the antenna (8) is electrically connected to the RF-part of the mobile equipment (1) via coil (9).

9. An integrated antenna (8) according to claim 1, characterized in that, the hinge element (4) further comprises integrated RF-parts.

10. An integrated antenna (8) according to claim 2, characterized in that, the hinge element (4) further comprises integrated RF parts.

11. An integrated antenna (8) according to claim 1 characterized in that, the antenna (8) is electrically connected to the RF-part of the mobile equipment (1) via cable (10).

12. An integrated antenna (8) according to claim 2 characterized in that, the antenna (8) is electrically connected to the RF-part of the mobile equipment (1) via cable (10).

13. An integrated antenna (8) according to claim 1 characterized in that, the antenna (8) is electrically connected to the RF-part of the mobile equipment (1) via coil (9).

14. An integrated antenna (8) according to claim 2 characterized in that, the antenna (8) is electrically connected to the RF-part of the mobile equipment (1) via coil (9).

* * * * *

UNITED STATES PATENT AND TRADEMARK OFFICE
CERTIFICATE OF CORRECTION

PATENT NO. : 6,980,162 B1 Page 1 of 1
DATED : December 27, 2005
INVENTOR(S) : Laaksonen It is certified that error appears in the above-identified patent and that said Letters Patent is hereby corrected as shown below:

<u>Column 3,</u>
Line 20, insert -- (10) -- after "cable".

Signed and Sealed this

Twenty-first Day of March, 2006

JON W. DUDAS
*Director of the United States Patent and Trademark Office*